US011921094B2

(12) United States Patent
Gomi et al.

(10) Patent No.: US 11,921,094 B2
(45) Date of Patent: Mar. 5, 2024

(54) LIQUID CHROMATOGRAPHIC SYSTEM

(71) Applicant: SHIMADZU CORPORATION, Kyoto (JP)

(72) Inventors: Tomohiro Gomi, Kyoto (JP); Daisuke Kitabayashi, Kyoto (JP); Shinya Imamura, Kyoto (JP); Keisuke Ogawa, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 246 days.

(21) Appl. No.: 17/438,418

(22) PCT Filed: Mar. 13, 2019

(86) PCT No.: PCT/JP2019/010217
§ 371 (c)(1),
(2) Date: Sep. 11, 2021

(87) PCT Pub. No.: WO2020/183638
PCT Pub. Date: Sep. 17, 2020

(65) Prior Publication Data
US 2022/0146473 A1     May 12, 2022

(51) Int. Cl.
*G01N 30/86*     (2006.01)
*G01N 30/32*     (2006.01)
*G01N 30/02*     (2006.01)

(52) U.S. Cl.
CPC ......... *G01N 30/8675* (2013.01); *G01N 30/32* (2013.01); *G01N 2030/027* (2013.01)

(58) Field of Classification Search
CPC ............... G01N 30/8675; G01N 30/32; G01N 2030/027; G01N 2030/326; G01N 2030/889; G01N 30/88
(Continued)

(56) References Cited

U.S. PATENT DOCUMENTS 4,448,692 A    5/1984   Nakamoto et al.
2002/0084222 A1   7/2002   Brann
(Continued)

FOREIGN PATENT DOCUMENTS

EP        0106009 A1    4/1984
JP         60-011690 A    1/1985
(Continued)

OTHER PUBLICATIONS

Notice of Reasons for Refusal for corresponding Japanese Patent Application No. 2021-505495 dated Jul. 5, 2022, with English language machine translation.
(Continued)

*Primary Examiner* — Robert R Raevis
(74) *Attorney, Agent, or Firm* — Renner, Otto, Boisselle & Sklar, LLP

(57) ABSTRACT

Liquid sent by a liquid sending pump flows through an analysis flow path. A sample is injected into the analysis flow path. A separation column is provided in the analysis flow path. A sample injected in the separation column is separated into components, and sample components obtained by separation are detected by a detector. The number of liquid sending pumps and a connection structure of the liquid sending pumps connected to the analysis flow path are specified by a system configuration specifier as a system configuration. A condition for detecting a liquid sending failure in a liquid sending pump that is preset for each type of system configuration is held by a condition holder. A condition corresponding to a system configuration is determined from conditions held by the condition holder. A liquid sending failure in a liquid sending pump is detected with use of the determined condition.

8 Claims, 5 Drawing Sheets

(58) Field of Classification Search
USPC ......... 73/1.02, 61.52, 61.57, 37, 866, 865.5, 73/865.9
See application file for complete search history.

(56) References Cited

U.S. PATENT DOCUMENTS

| | | |
|---|---|---|
| 2004/0055938 A1 | 3/2004 | Brann |
| 2005/0145547 A1 | 7/2005 | Brann |
| 2005/0147508 A1 | 7/2005 | Luongo et al. |
| 2006/0163133 A1 | 7/2006 | Brann |
| 2007/0248491 A1 | 10/2007 | Brann |
| 2008/0245136 A1 | 10/2008 | Gerhardt et al. |
| 2009/0324447 A1 | 12/2009 | Brann |
| 2010/0307227 A1 | 12/2010 | Brann |
| 2013/0064683 A1 | 3/2013 | Oshima et al. |
| 2016/0153942 A1 | 6/2016 | Yotani et al. |
| 2019/0211813 A1 | 7/2019 | Yanagibayashi et al. |

FOREIGN PATENT DOCUMENTS

| | | |
|---|---|---|
| JP | 11-326300 A | 11/1999 |
| JP | 2000-130353 A | 5/2000 |
| JP | 2001-147222 A | 5/2001 |
| JP | 2004-524518 A | 8/2004 |
| WO | 2018/055866 A1 | 3/2018 |

OTHER PUBLICATIONS

International Search Report for corresponding Application No. PCT/JP2019/010217, dated Jun. 18, 2019.
Written Opinion for corresponding Application No. PCT/JP2019/010217, dated Jun. 18, 2019 (English machine translation).
Co-pending U.S. Appl. No. 17/438,076, filed Sep. 10, 2021.
Co-pending U.S. Appl. No. 17/438,419, filed Sep. 11, 2021.
Co-pending U.S. Appl. No. 17/438,421, filed Sep. 11, 2021.
Notice of Reasons for Refusal for corresponding Japanese Patent Application No. 2021-504700 dated Jul. 5, 2022, with English language machine translation.
Notice of Reasons for Refusal for corresponding Japanese Patent Application No. 2021-504712 dated Jul. 26, 2022, with English language machine translation.
Office Action in corresponding counterpart Chinese Patent Application No. 201980093792.2 dated Jun. 29, 2023, with English machine transiation.
Office Action for related Chinese Patent Application No. 201980093712.3 dated Jul. 17, 2023, with English language machine translation.
Office Action for co-pending U.S. Appl. No. 17/438,419 dated Nov. 6, 2023.
Office Action for co-pending U.S. Appl. No. 17/438,076 dated Nov. 6, 2023.
Office Action in corresponding Chinese Patent Application No. 201980093792.2 dated Dec. 18, 2023, with English machine translation.

F I G. 1
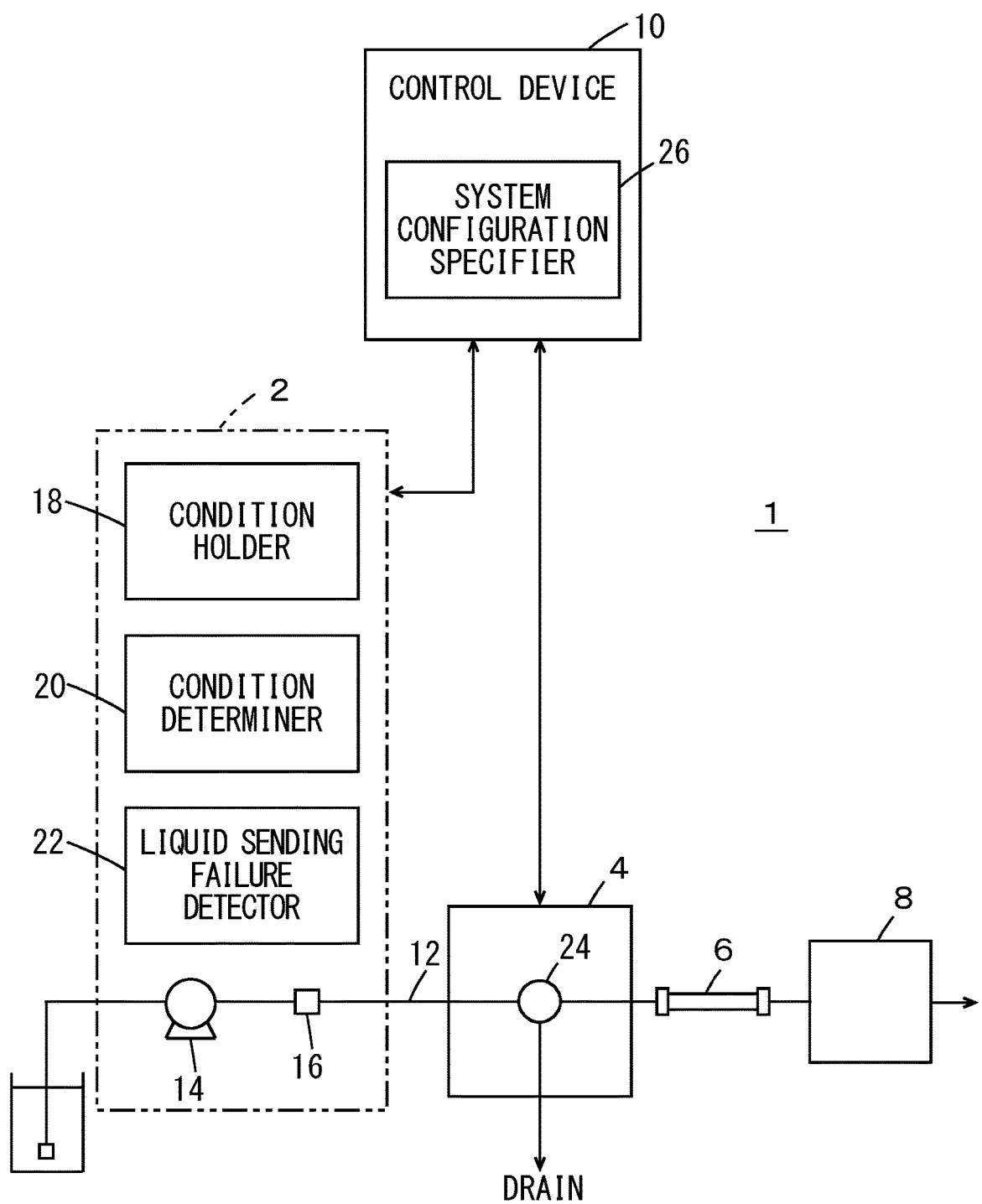

LIQUID CHROMATOGRAPHIC SYSTEM

TECHNICAL FIELD

The present invention relates to a liquid chromatographic system.

BACKGROUND ART

It is required that a liquid chromatograph has an ability to stably send a mobile phase at a set flow rate into an analysis flow path by using at least one liquid sending pump. For a liquid sending pump, a single plunger system including a single plunger pump and a double plunger system including two plunger pumps are employed.

When a plunger pump discharges a solvent, a periodically large fluctuation of liquid sending pressure that is so-called pulsation may occur when a liquid sending pressure decreases due to compression of solvent, leakage of liquid from a check valve, entrapment of fine bubbles in a flow path, shortage of solvent, etc. When pulsation occurs, the flow rate of a mobile phase is disrupted, and a result of analysis is negatively affected. This is a loss for a user. Therefore, measures have been taken to suppress pulsation by control of an operation of a plunger pump (see Patent Document 1), remove bubbles by use of a degassing unit or discharge bubbles in a flow path to outside by sending of a solvent at a high flow rate before an analysis is started, etc.

CITATION LIST

Patent Document

[Patent Document 1] JP 2001-147222 A

SUMMARY OF INVENTION

Technical Problem

Even with above-mentioned measures being taken, due to reasons such as a gas component that remained in a solvent becoming bubbles in a plunger pump or bubbles being generated when dissolved oxygen in a solvent was saturated due to a change in temperature, bubbles were entrapped in the plunger pump that was sending liquid, and an analysis continued. In such a case, the user continues to wastefully acquire analysis data.

As such, a function for automatically detecting a liquid sending failure of a liquid sending pump using some condition is preferably incorporated in an analysis system. However, there are a variety of analysis systems for a liquid chromatograph, and the number of liquid sending pumps can be increased to two, three or four. There are also a variety of connection structures of a liquid sending pump in a case where the number of liquid sending pumps is increased. The magnitude of impact of a liquid sending failure of each liquid sending pump on an analysis system differs depending on the number of liquid sending pumps or how the liquid sending pumps are connected. Therefore, when an attempt is made to detect a liquid sending failure among analysis systems having different system configurations using the same condition, accuracy of detection of a liquid sending failure is degraded.

The present invention was conceived considering the above-mentioned problems, and an object of the present invention is to enable accurate detection of a liquid sending failure of a liquid sending pump under a condition corresponding to a system configuration.

Solution to Problem

A liquid chromatographic system according to the present invention includes an analysis flow path to which at least one liquid sending pump is connected and through which liquid that is sent by the liquid sending pump flows, a sample injector that injects a sample into the analysis flow path, a separation column that is provided on the analysis flow path and is to separate a sample that has been injected into the analysis flow path into components, a detector that is provided on the analysis flow path and is to detect sample components obtained by separation in the separation column, a system configuration specifier that specifies a count and a connection structure of the liquid sending pumps connected to the analysis flow path as a system configuration, a condition holder holding a condition that is for detection of a liquid sending failure of the liquid sending pump and is preset in regard to each type of the system configuration, a condition determiner that is configured to determine the condition corresponding to a system configuration specified by the system configuration specifier from among conditions held by the condition holder, and a liquid sending failure detector configured to detect a liquid sending failure of the liquid sending pump using the condition determined by the condition determiner.

Advantageous Effects of Invention

With the liquid chromatographic system according to the present invention, conditions for detecting a liquid sending failure of a liquid sending pump in regard to respective types of system configurations are held, a condition corresponding to a system configuration is determined from among these conditions, and a liquid sending failure of a liquid sending pump is detected with use of a determined condition. Therefore, a liquid sending failure of the liquid sending pump can be detected accurately under a condition suitable for the system configuration.

BRIEF DESCRIPTION OF THE DRAWINGS

FIG. 1 A diagram showing the schematic configuration of one inventive example of a liquid chromatographic system.

DESCRIPTION OF EMBODIMENTS

Figure 2:
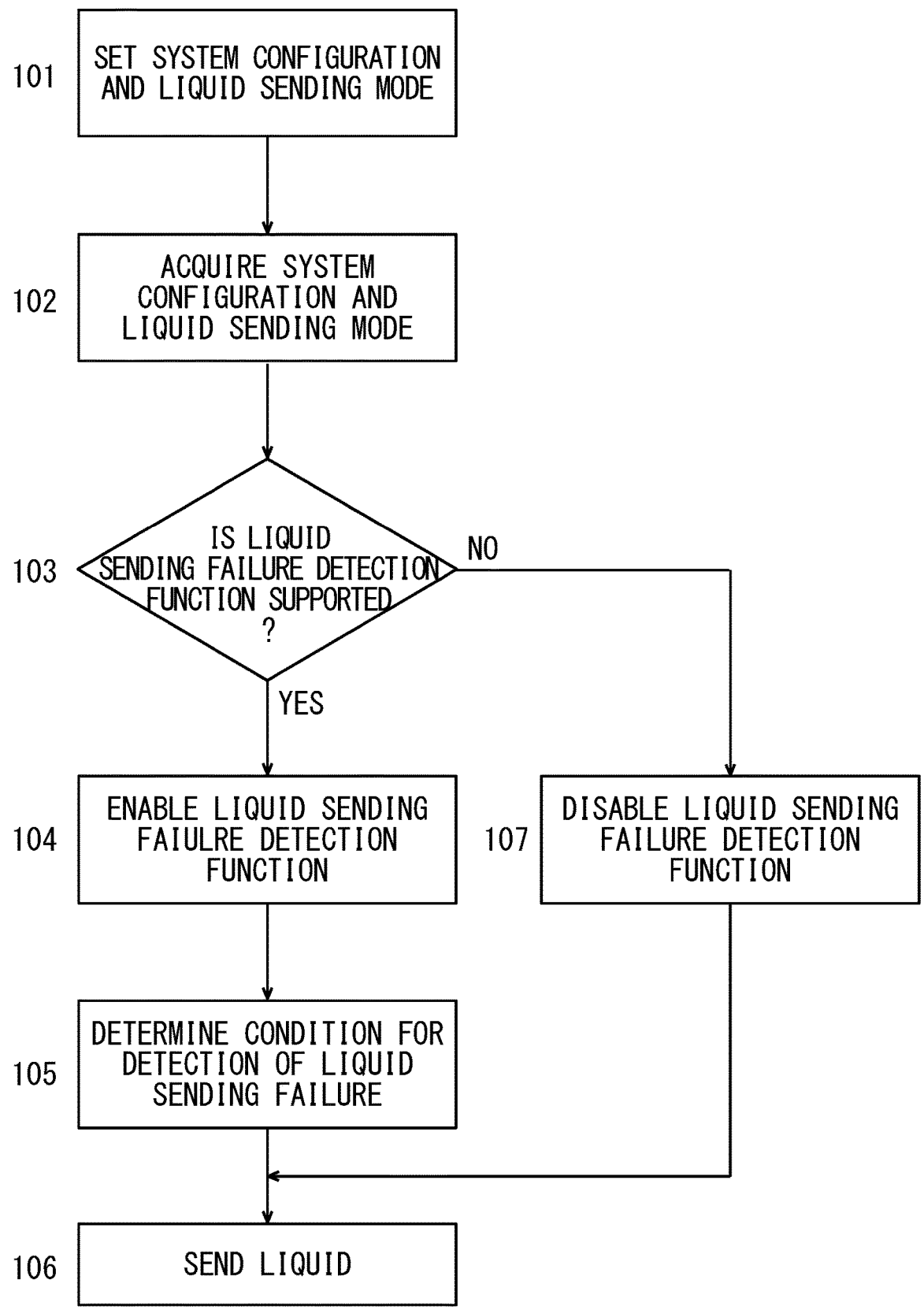
FIG. 2 A flowchart showing one example of an operation that is performed until a condition is determined in the same inventive example.

One inventive example of a liquid chromatographic system according to the present invention will be described below with reference to the drawings.

As shown in FIG. 1, a liquid chromatographic system 1 (hereinafter referred to as an analysis system 1) includes a liquid sending system 2, a sample injector 4, a separation column 6, a detector 8 and a control device 10.

The liquid sending system 2 includes a liquid sending pump 14 that sends a mobile phase into an analysis flow path 12 and a pressure sensor 16 for detecting a liquid sending pressure applied by the liquid sending pump 14. While only one liquid sending pump 14 is provided in FIG. 1, by way of example, two or more liquid sending pumps may be provided.

While not being shown in the diagram, the liquid sending pump 14 has two plunger pumps that are driven complementarily with each other and consecutively send liquid, for example. In such a liquid sending pump 14, bubbles are entrapped in pump chambers of the plunger pumps, so that a liquid sending failure which causes instability of liquid sending flow rate occurs.

In the liquid sending system 2, a condition holder 18, a condition determiner 20 and a liquid sending failure detector 22 are provided as functions for detecting an occurrence of a liquid sending failure caused by the liquid sending pump 14. The condition determiner 20 and the liquid sending failure detector 22 are functions obtained by execution of a predetermined program in a computer circuit that partially constitutes the liquid sending system 2, and the condition holder 18 is a function implemented by part of a storage area of a storage device that is provided in the liquid sending system 2. Details of the condition holder 18, the condition determiner 20 and the liquid sending failure detector 22 will be described below.

The sample injector 4 is connected to a position farther downstream than the liquid sending pump 14. The sample injector 4 is to inject a sample into the analysis flow path 12. In the inventive example, the sample injector 4 includes a switch valve 24 for switching the connection states of a flow path. The switch valve 24 switches between a state in which a mobile phase from the liquid sending system 2 flows to the separation column 6 and a state in which a mobile phase is discharged to a drain. The switch valve 24 of the sample injector 4 is not necessarily required to include a function of switching between a state in which a mobile phase from the liquid sending system 2 flows to the separation column 6 and a state in which a mobile phase is discharged to the drain. In this case, separately from the sample injector 4, a switch valve for switching between a state in which a mobile phase from the liquid sending system 2 flows to the separation column 6 and a state in which a mobile phase is discharged to the drain may be provided or not provided.

The separation column 6 is connected to a position farther downstream than the sample injector 4 on the analysis flow path 12, and the detector 8 is connected to a position farther downstream than the separation column 6. The separation column 6 is to separate a sample that has been injected into the analysis flow path 12 by the sample injector 4 into components, and the sample components obtained by separation in the separation column 6 are detected by the detector 8.

The control device 10 is to manage the operations of at least the liquid sending system 2 and the sample injector 4, and is realized by a system controller dedicated to the analysis system 1 and/or a general personal computer, for example. When the liquid sending failure detector 22 of the liquid sending system 2 detects a liquid sending failure of the liquid sending pump 14, a signal indicating detection of a liquid sending failure is transmitted to the control device 10. In this case, when it is set in advance that a purge operation for resolving a liquid sending failure is to be performed, the control device 10 transmits an instruction for switching the switch valve 24 to the sample injector 4 such that a mobile phase is guided to the drain, and transmits an instruction for increasing a liquid sending flow rate to a predetermined high flow rate to the liquid sending system 2. Thus, bubbles entrapped in the liquid sending pump 14 are discharged to the drain.

Further, the control device 10 includes a system configuration specifier 26. The system configuration specifier 26 is a function obtained by execution of a predetermined program in the control device 10. The system configuration specifier 26 is configured to specify the number of liquid sending pumps and the connection structure of the liquid sending pumps connected to the analysis flow path 12 as a system configuration. Information such as how and how many liquid sending pumps are connected to where in the analysis flow path 12 is input to the control device 10 by an operator when the analysis system 1 is constructed. The system configuration specifier 26 specifies the system configuration of the analysis system 1 based on the input information.

The condition holder 18 of the liquid sending system 2 holds a plurality of conditions that are for detection of a liquid sending failure of the liquid sending pump 14 and set in advance in accordance with the system configuration of the analysis system 1 and a liquid sending mode of the liquid sending pump 14.

A plurality of conditions to be held by the condition holder 18 may be a condition table as shown in the following table 1.

TABLE 1

| SYSTEM CONFIGURATION | LIQUID SENDING MODE | CONDITION |
|---|---|---|
| 1 | ISO | CONDITION A |
|  | LPGE | CONDITION B |
| 2 | ISO + ISO | CONDITION C |
|  | ISO + LPGE | CONDITION D |
|  | LPGE + LPGE | CONDITION E |
|  | B. GE | CONDITION F |
| 3 | ISO + ISO + ISO | CONDITION G |
|  | T. GE | CONDITION H |
| . | . | . |
| . | . | . |
| . | . | . |

In the above-mentioned condition table, conditions for detection of a liquid sending failure are respectively set with respect to the numbers of the liquid sending pumps and liquid sending modes that can be set for respective numbers of liquid sending pumps. For example, in a case where the number of liquid sending pumps is one, one of an ISO mode and an LPGE mode (a low-pressure gradient mode) can be set as a liquid sending mode. The ISO mode is a mode in which a mobile phase of a single composition is to be sent. In the LPGE mode, a solvent to be sent by the liquid sending pump is switched by the switch valve, and a solvent is sent while a mixture ratio of solvent is changed. In the ISO mode, because the composition of a mobile phase flowing through the analysis flow path does not change, a liquid sending pressure is substantially constant. Therefore, in a case where a liquid sending failure is to be detected based on a liquid sending pressure, it is not necessary to always obtain a reference value for evaluation of a liquid sending pressure by calculation. On the other hand, in the LPGE mode, because the composition of a mobile phase flowing through the analysis flow path changes over time, a liquid sending pressure also changes over time. Therefore, in a case where a liquid sending failure is detected based on a liquid sending pressure, it is preferable that a reference value for evaluation of a liquid sending pressure is always obtained by calculation. Therefore, different conditions (a condition A and a condition B) that are different from each other are set for the ISO mode and the LPGE mode, respectively. In a case where the number of liquid sending pumps are two or more, a greater variety of liquid sending modes are present, and conditions are respectively set for the liquid sending modes.

For example, a user sets a liquid sending mode of the liquid sending pump 14 with respect to the control device 10 before an analysis is started. When a liquid sending mode is set, the control device 10 transmits information for an operation in the liquid sending mode to the liquid sending system 2.

The condition determiner 20 is configured to determine a condition corresponding to the actual system configuration and the liquid sending mode from among the conditions held by the condition holder 18 when receiving information in regard to a system configuration and a liquid sending mode from the control device 10.

The liquid sending failure detector 22 is configured to detect a liquid sending failure of the liquid sending pump 14 using a condition determined by the condition determiner 20.

One example of an operation that is performed until a condition for detection of a liquid sending failure is determined is shown in the flowchart of FIG. 2.

A system configuration and a liquid sending mode are set by the user before an analysis is started (step 101). When a liquid sending mode is set, the condition determiner 20 acquires information in regard to the system configuration and the liquid sending mode from the control device 10 (step 102). The control device 10 may notify the condition determiner 20 of the information in regard to the system condition and the liquid sending mode. It is considered that a liquid sending detection function of the liquid sending system 2 is not supported depending on a system configuration and a liquid sending mode. As such, the condition determiner 20 confirms whether a condition corresponding to the system configuration and the liquid sending mode acquired from the control device 10 is present among conditions held by the condition holder 18 (whether the liquid sending failure detection function is supported) (step 103). In a case where a corresponding condition is present, the condition determiner 20 enables the liquid sending failure detection function and determines a condition for detection of a liquid sending failure (steps 104, 105). Thereafter, when the liquid sending system 2 starts sending liquid (step 106), the liquid sending failure detector 22 performs detection of a liquid sending failure of the liquid sending pump 14 using the condition determined by the condition determiner 20. On the other hand, in a case where a condition corresponding to the system configuration and the liquid sending mode acquired from the control device 10 is not present, the liquid sending failure detection function is disabled (step 107). In this case, even when the liquid sending system 2 starts sending liquid, a liquid sending failure is not detected by the liquid sending failure detector 22.

Here, a "condition" for detecting a liquid sending failure of the liquid sending pump 14 may include an algorithm of detection of pulsation that occurs when bubbles are entrapped in the liquid sending pump 14 by comparison of a fluctuation range of liquid sending pressure in a certain driving period of the liquid sending pump 14 with a predetermined reference value. Although the "fluctuation range of liquid sending pressure in a certain driving period of the liquid sending pump 14" may be a fluctuation range of liquid sending pressure in one driving period of the liquid sending pump 14, the "fluctuation range of liquid sending pressure in a certain driving period of the liquid sending pump 14" may be fluctuation ranges of liquid sending pressure in a plurality of driving periods of the liquid sending pump 14 or their average value. A fluctuation of liquid sending pressure in a case where bubbles are entrapped in the liquid sending pump 14 will be described with reference to a pressure waveform of FIG. 5.

Figure 5:
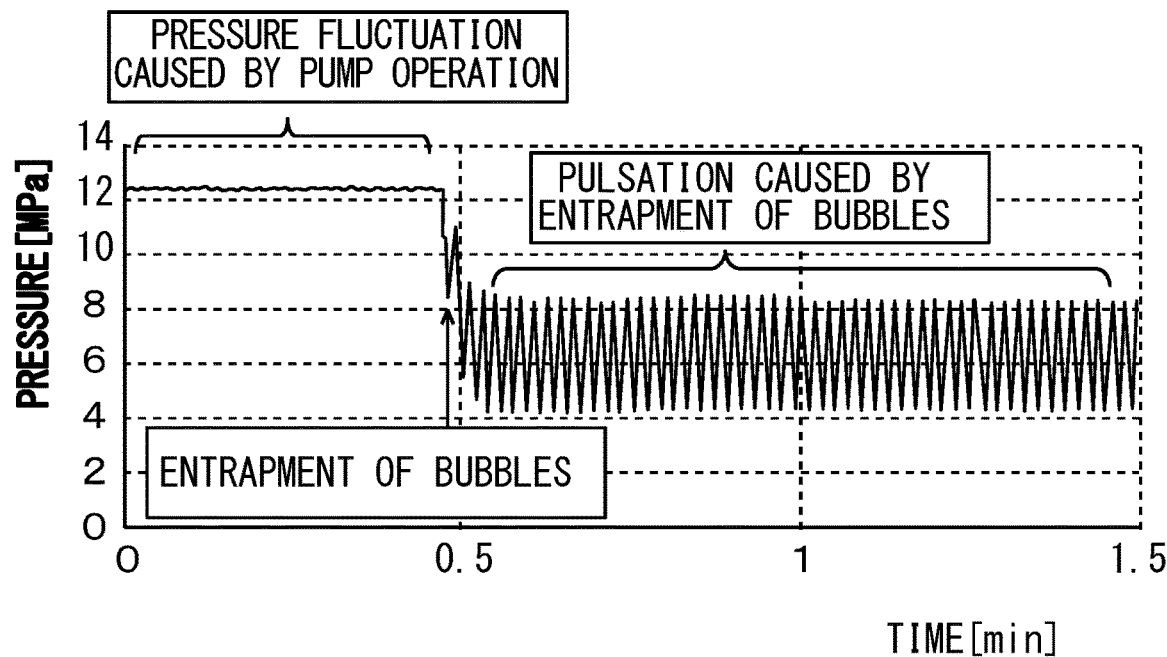
FIG. 5 One example of a waveform of a liquid sending pressure when entrapment of bubbles occurs in a liquid sending pump.

As shown in the left part of the pressure waveform of FIG. 5, when the liquid sending pump 14 is being able to stably send a mobile phase, although a subtle pressure fluctuation caused by an operation of the liquid sending pump, or the like can be seen, the liquid sending pressure is stable. In a case where bubbles are entrapped in one plunger pump of the liquid sending pump 14, when the plunger pump is performing a discharging operation, liquid is not discharged normally due to compression of bubbles, and a liquid sending pressure decreases rapidly. When the other plunger pump is performing a discharging operation, a liquid sending pressure increases since liquid is discharged normally. As a result, as shown in the right part of the pressure waveform of FIG. 5, when bubbles are entrapped in the liquid sending pump 14, a periodical fluctuation (pulsation) of liquid sending pressure occurs. Therefore, the algorithm of detection of pulsation that is synchronized with a driving period of the liquid sending pump 14 can be included in a condition for detection of a liquid sending failure of the liquid sending pump 14 caused by entrapment of bubbles.

One example of the algorithm of detection of pulsation will be described with reference to the flowchart of FIG. 3. The below-described algorithm is an algorithm applied to one liquid sending pump. In a case where a plurality of liquid sending pumps are connected to the analysis flow path 12, a similar algorithm is applied to each liquid sending pump. Further, the algorithm described here is an algorithm included in a condition that is set with respect to a liquid sending mode in which a driving speed of the liquid sending pump changes over time and a liquid sending mode in which the composition of a mobile phase changes over time, and always includes a step of determining a reference value (step 201).

Figure 3:
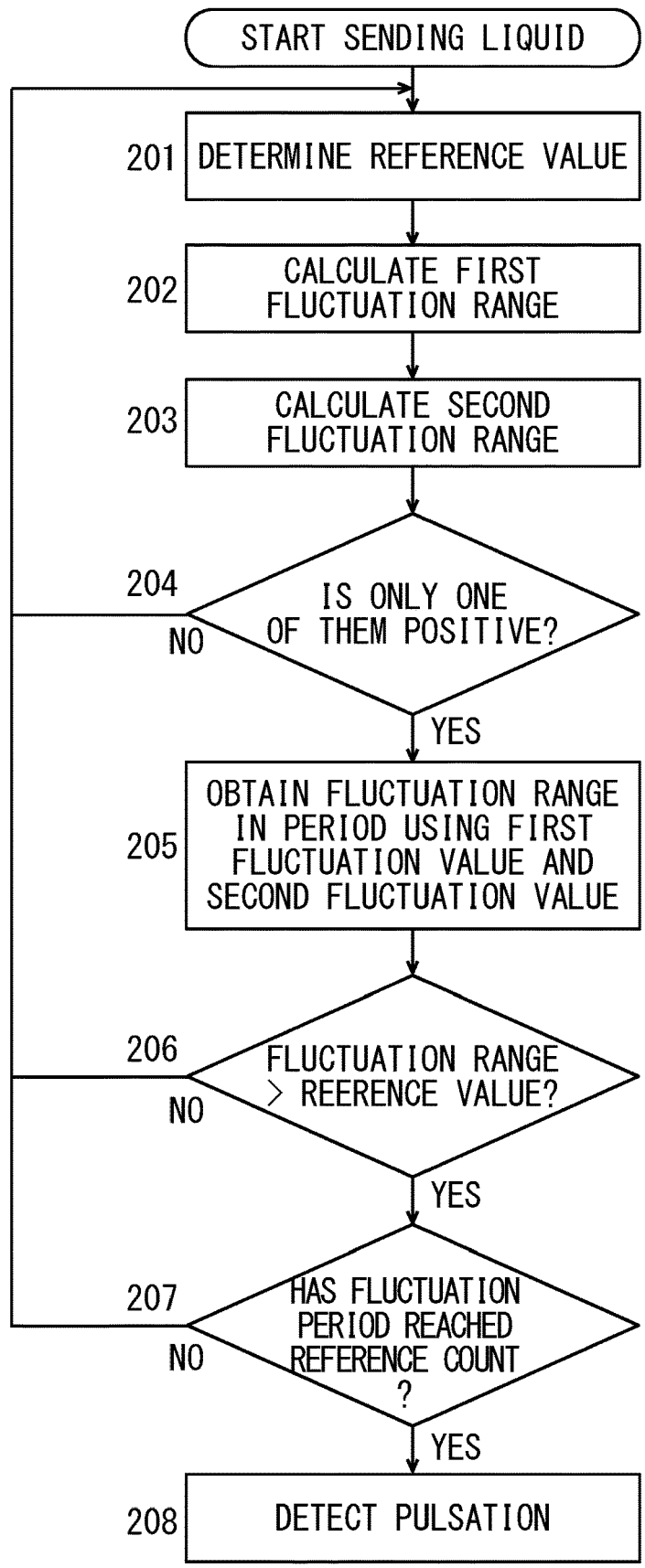
FIG. 3 A flowchart for explaining the algorithm of detection of pulsation in the inventive example.

The algorithm of FIG. 3 is advantageous in a case where a fluctuation of liquid sending pressure in one driving period of the liquid sending pump 14 can be read in several tens of segments. In this case, liquid sending pressures at a start point and an end point of a discharging operation of each plunger pump of the liquid sending pump 14 can be read accurately. Here, one driving period of the liquid sending pump 14 refers to a period from a point in time at which one plunger pump of the plunger pumps that constitute the liquid sending pump 14 starts a discharging operation to a point in time at which the other plunger pump ends a discharging operation.

A computer circuit that constitutes the liquid sending failure detector 22 acquires signals of the pressure sensor 16 at a predetermined frequency and reads a liquid sending pressure (a moving average value). The liquid sending failure detector 22 executes the below-mentioned steps 201 to 208.

The liquid sending failure detector 22 determines a reference value in consideration of a contribution ratio of the liquid sending pump 14 with respect to a liquid sending flow rate in the analysis flow path 12 (a flow rate ratio of each liquid sending pump with respect to an entire flow rate in a case where a plurality of liquid sending pumps send liquid simultaneously), a liquid sending pressure, etc. (step 201). Thereafter, when reading liquid sending pressures at a start point and an end point of a discharging operation of one plunger pump of the plunger pumps that constitute the liquid sending pump 14, the liquid sending failure detector 22 obtains the difference (the liquid sending pressure at the start point minus the liquid sending pressure at the end point) as a first fluctuation value (step 202). When reading liquid sending pressures at a start point and an end point of a discharging operation of the other plunger pump, the liquid sending failure detector 22 obtains the difference (the liquid sending pressure at the start point minus the liquid sending pressure at the end point) as a second fluctuation value (step 203). In a case where bubbles are entrapped in one of the plunger pumps that constitute the liquid sending pump 14, a liquid sending pressure decreases when one plunger pump in which bubbles are entrapped is performing a discharging operation, and a liquid sending pressure increases when the other plunger pump in which bubbles are not entrapped is performing a discharging operation. Therefore, in a case where a liquid sending failure caused by entrapment of bubbles has occurred in the liquid sending pump 14, only one of the first fluctuation value and the second fluctuation value is a positive value (the other value is a negative value). Therefore, in a case where the signs of a first fluctuation value and a second fluctuation value are the same, the liquid sending failure detector 22 determines that pulsation is not caused by entrapment of bubbles (step 204).

In a case where only one of a first fluctuation value and a second fluctuation value is a positive value, the liquid sending failure detector 22 obtains a fluctuation range of liquid sending pressure in one driving period of the liquid sending pump 14 using the first fluctuation value and the second fluctuation value (step 205). A fluctuation range of liquid sending pressure can be obtained by a following formula, for example.

A fluctuation range=|a first fluctuation value−a second fluctuation value|/2

The above-mentioned formula is one example, and a fluctuation range may be obtained using a formula such as A fluctuation range=|a first fluctuation value−a second fluctuation value| or

A fluctuation range=(a first fluctuation value−a second fluctuation value)$^2$

The liquid sending failure detector 22 compares the above-mentioned fluctuation value with a predetermined reference value (step 206). In a case where the fluctuation value exceeds the reference value, the liquid sending failure detector 22 counts the number of consecutive driving periods (fluctuation periods) in which the fluctuation value exceeds the reference value (step 207). Then, when the number of consecutive fluctuation periods reaches a predetermined reference count, pulsation is detected (steps 208).

Here, a fluctuation range $\Delta P$ of liquid sending pressure caused by bubbles entrapped in the liquid sending pump 14 is determined by a time constant $\tau$ of the liquid chromatograph. A time constant $\tau$ is a value that depends on an entire liquid sending pressure P[MPa], a damper C [uL/MPa] and a liquid sending flow rate Q[mL/min]. For example, in a case where a period of time that has elapsed since bubbles are entrapped in the liquid sending pump 14 is t seconds, it is considered that the fluctuation range $\Delta P$ of liquid sending pressure is determined by the following formula.

$$\Delta P \propto e^{-\frac{t}{\tau}} = (P, C, Q, t)$$

Therefore, a reference value for determination in regard to whether pulsation is caused by entrapment of bubbles in the liquid sending pump 14 can be determined in consideration of $\Delta P$ obtained by the above-mentioned formula. However, some of arguments P, C, Q, t (or P, V, $\beta$, Q, t) of the above-mentioned formula may be not used, and a reference value may be determined more simply. For example, $\Delta P$ that is obtained when only P, C are taken as arguments and other elements are taken as fixed values may be used as a reference.

In a case where a mobile phase is sent into the common analysis flow path 12 by a plurality of liquid sending pumps, a contribution ratio of each liquid sending pump with respect to a liquid sending flow rate (liquid sending pressure) is preferably taken into consideration for determination of a reference value. Therefore, algorithms are different between a case where one liquid sending pump is connected to the analysis flow path 12 and a case where a plurality of liquid sending pumps are connected to the analysis flow path 12 in regard to at least whether a reference value is to be determined in consideration of a contribution ratio.

Here, a reference count which is to be used as a reference in regard to the number of consecutive pressure fluctuations for determination of pulsation may be adjusted variably. If so, the reference count can be adjusted in accordance with the degree of sensitivity of detection of pulsation.

An algorithm of detection of pulsation is not limited to the above-mentioned algorithm. For example, it is possible to detect pulsation by monitoring a liquid sending pressure in one driving period of the liquid sending pump 14, obtaining a fluctuation range of liquid sending pressure in one driving period and using an algorithm of comparing the fluctuation range with a predetermined reference value.

Figure 4:
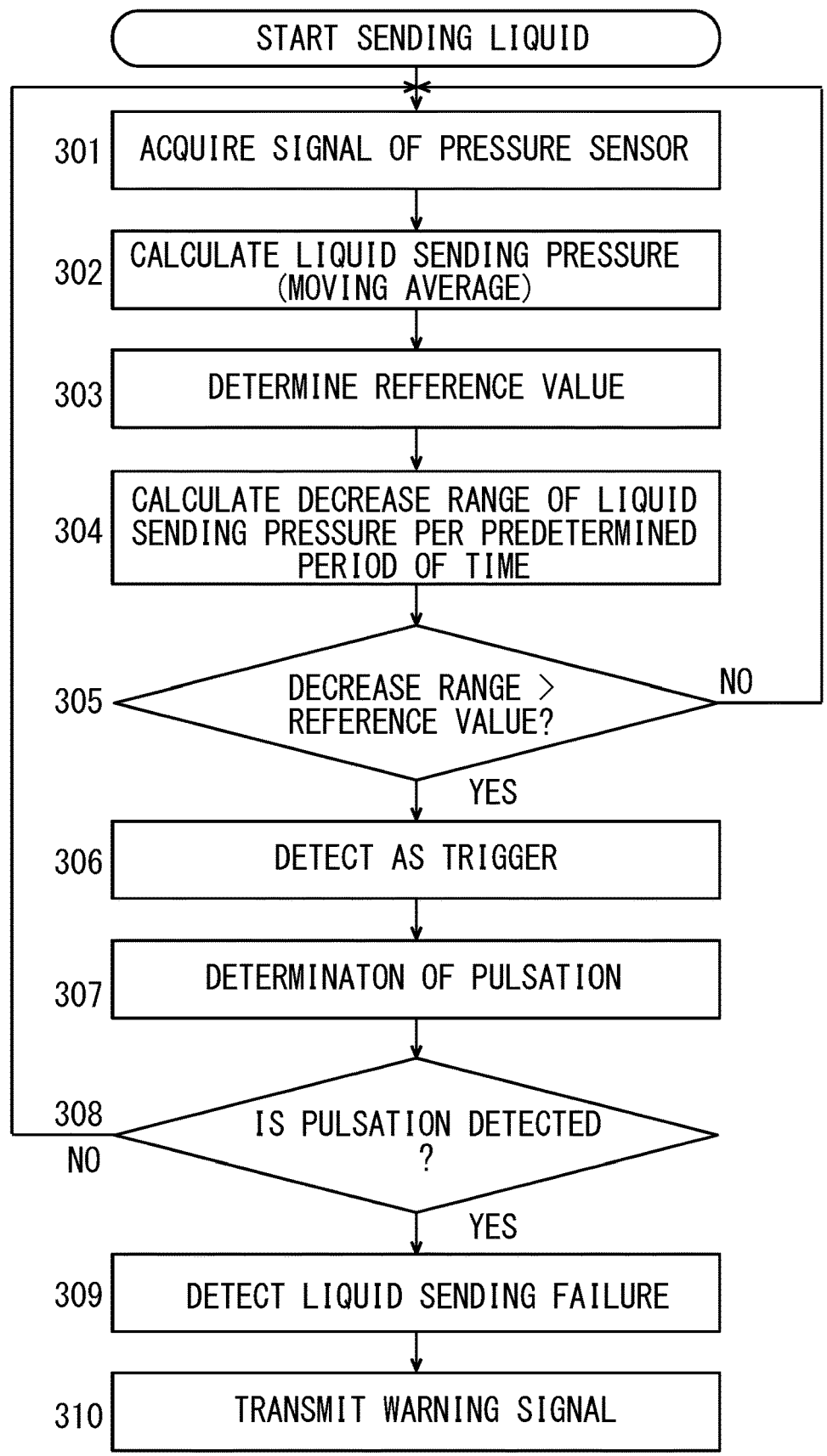
FIG. 4 A flowchart for explaining the algorithm of detection of a trigger in the same inventive example.

The above-mentioned algorithm of monitoring a liquid sending pressure for one driving period of the liquid sending pump 14 is effective in a case where liquid sending pressures at a start point and an end point of a discharging operation of each plunger pump that constitutes the liquid sending pump 14 cannot be accurately read. However, the algorithm cannot judge whether a liquid sending pressure has decreased or increased in one driving period of the liquid sending pump 14, thereby not being able to certainly determine whether a pressure fluctuation is caused by entrapment of bubbles. As such, before the algorithm of detection of pulsation is executed, an algorithm of detection of a trigger as shown in the flowchart of FIG. 4 may be introduced.

The algorithm of detection of a trigger will be described below with reference to FIG. 4.

A computer circuit that constitutes the liquid sending failure detector 22 reads a signal of the pressure sensor 16 in a predetermined period (step 301) and calculates a liquid sending pressure (moving average value) (step 302). The liquid sending failure detector 22 determines a reference value for detection of a trigger in consideration of a contribution ratio of the liquid sending pump 14 (in a case where a plurality of liquid sending pumps are provided), a liquid sending pressure and so on (step 303). A reference value for detection of a trigger may be the same as or different from a reference value for detection of pulsation. The liquid sending failure detector 22 calculates a decrease range of liquid sending pressure per period of time (a period of time in which a signal is read ten times, for example) that is set based on a driving period of the liquid sending pump 14

(step 304). Then, the calculated decrease range is compared with a reference value (step 305). When the decrease range exceeds the reference value, it is detected as a trigger for an occurrence of pulsation (step 306).

After detecting a trigger, the liquid sending failure detector 22 performs detection of pulsation using an algorithm of detection of pulsation (step 307). In a case where pulsation is detected, the liquid sending failure detector 22 detects a liquid sending failure (steps 308, 309) and transmits a warning signal to the control device 10 (step 310). In a case where pulsation is not detected, the process returns to the above-mentioned step 301 (step 308).

Coefficients to be used for determination of a period in which a signal is to be read from the pressure sensor 16, a reference value for detection of a trigger and a reference value for detection of pulsation by calculation may be adjusted variably by a user's input of a change instruction or based on user's evaluation in regard to a result of actual detection of liquid sending failure. Further, in a case where the analysis system of the liquid chromatograph is connected to a common database shared with an analysis system of another liquid chromatograph through a network line such as an internet line, each coefficient, described above, may be automatically adjusted based on user's evaluation accumulated in the database in regard to a result of detection of liquid sending failure.

While the liquid sending system 2 is provided with each of the functions of the condition holder 18, the condition determiner 20 and the liquid sending failure detector 22 in the above-mentioned inventive example, the present invention is not limited to this. Part or all of these functions may be provided in the control device 10.

The above-mentioned inventive example is merely one example of embodiments of the liquid chromatographic system according to the present invention. The embodiments of the liquid chromatograph according to the present invention are as follows.

An embodiment of a liquid chromatographic system according to the present invention includes an analysis flow path to which at least one liquid sending pump is connected and through which liquid that is sent by the liquid sending pump flows, a sample injector that injects a sample into the analysis flow path, a separation column that is provided on the analysis flow path and is to separate a sample that has been injected into the analysis flow path into components, a detector that is provided on the analysis flow path and is to detect sample components obtained by separation in the separation column, a system configuration specifier that specifies a count and a connection structure of the liquid sending pumps connected to the analysis flow path as a system configuration, a condition holder holding a condition that is for detection of a liquid sending failure of the liquid sending pump and is preset in regard to each type of the system configuration, a condition determiner that is configured to determine the condition corresponding to a system configuration specified by the system configuration specifier from among conditions held by the condition holder, and a liquid sending failure detector configured to detect a liquid sending failure of the liquid sending pump using the condition determined by the condition determiner.

In a first aspect of the above-mentioned embodiment of the liquid chromatographic system according to the present invention, the condition holder holds the condition in regard to each liquid sending mode of the liquid sending pump of each type of the system configuration, and the condition determiner is configured to determine the condition corresponding to a system configuration specified by the system configuration specifier and the condition corresponding to a liquid sending mode of the liquid sending pump. Thus, because an optimal condition is used for detection of a liquid sending failure in accordance with the system configuration and the liquid sending mode, a liquid sending failure can be accurately detected.

In a second aspect of the embodiment of the liquid chromatographic system according to the present invention claim 1, a pressure sensor for detecting a liquid sending pressure in the analysis flow path is included, the condition includes an algorithm of detection of a liquid sending failure of the liquid sending pump with use of a liquid sending pressure detected by the pressure sensor, the liquid sending failure detector is configured to periodically acquire a liquid sending pressure detected by the pressure sensor and detect a liquid sending failure of the liquid sending pump by using an acquired liquid sending pressure and the algorithm of a condition determined by the condition determiner. In a case where a liquid sending failure occurs in the liquid sending pump, pulsation in which a liquid sending pressure fluctuates periodically often occurs. Therefore, it is possible to detect a liquid sending failure accurately by detecting a liquid sending failure based on a liquid sending pressure.

In the above-mentioned second embodiment, the algorithm may be configured to execute, a pulsation detection step of obtaining a fluctuation range of a liquid sending pressure in a certain driving period of the liquid sending pump and detecting pulsation on a condition that an obtained fluctuation range exceeds a predetermined reference value, and a liquid sending failure detection step of detecting a liquid sending failure of the liquid sending pump when the pulsation is detected, in this order. Thus, pulsation caused by entrapment of bubbles in the liquid sending pump can be detected.

In the above-mentioned case, the algorithm, before the pulsation detection step, may be configured to execute a reference value determination step of determining the reference value to be compared with the fluctuation range. If so, even in a case where a liquid sending pressure changes over time, an appropriate reference value is determined automatically. Thus, pulsation can be detected accurately.

In the above-mentioned case, the algorithm of the condition corresponding to a system configuration in which a plurality of liquid sending pumps are connected to the analysis flow path, in the reference value determination step, may be configured to determine the reference value in consideration of a contribution ratio of each of the plurality of liquid sending pumps with respect to a liquid sending flow rate in the analysis flow path. If so, even in a case where a plurality of liquid sending pumps are connected to the analysis flow path, a reference value is determined in consideration of the system configuration. Thus, pulsation can be detected accurately.

In the above-mentioned second aspect, the liquid sending pump may be a double plunger pump including two plunger pumps that are driven complimentarily with each other. In this case, the algorithm, in the pulsation detection step, may be configured to obtain a difference between the liquid sending pressures at a start point and an end point of a discharging operation of one of the two plunger pumps as a first fluctuation range, obtain a difference between the liquid sending pressures at a start point and an end point of a discharging operation of another one of the two plunger pumps as a second fluctuation value, and obtain the fluctuation range with use of the first fluctuation value and the second fluctuation value. If so, pulsation can be detected in consideration of a fluctuation of liquid sending pressure during a discharging operation of one plunger pump of the liquid sending pump and a fluctuation of liquid sending pressure during a discharging operation of the other plunger pump. Therefore, pulsation caused by entrapment of bubbles can be detected more accurately.

In the above-mentioned case, the algorithm, in the pulsation detection step, may be configured to count only a period in which only one of the first fluctuation value and the second fluctuation value is a positive value as a period in which the fluctuation range exceeds the reference value. In a case where bubbles are entrapped in one plunger pump of the double plunger pump, a liquid sending pressure decreases during a discharging operation of one plunger pump, and a liquid sending pressure increases during a discharging operation of the other plunger pump. Therefore, the first fluctuation value and the second fluctuation value have different signs. Therefore, it is possible to detect pulsation more accurately by counting a period in which only one of the first fluctuation value and the second fluctuation value is a positive value as one period of pulsation.

Further, in the above-mentioned second aspect, the algorithm, before the pulsation detection step, may be configured to execute a pressure decrease calculation step of calculating a decrease range of a liquid sending pressure per period of time that is set 30 based on the driving period of the liquid sending pump, and a trigger detection step of detecting a trigger for an occurrence of pulsation when a decrease range calculated in the pressure decrease calculation step exceeds the reference value, and execute the pulsation detection step after the trigger is detected in the trigger detection step. Thus, even in a case where a detailed fluctuation of liquid sending pressure in one driving period of the liquid 35 sending pump cannot be read, pulsation caused by entrapment of bubbles in the liquid sending pump can be detected accurately.

REFERENCE SIGNS LIST

1 Liquid chromatographic system
2 Liquid sending system
4 Sample injector
6 Separation column
8 Detector
10 Control device
12 Analysis flow path
14 Liquid sending pump
16 Pressure sensor
18 Condition holder
20 Condition determiner
22 Liquid sending failure detector
24 Switch valve
26 System configuration specifier

The invention claimed is:

1. A liquid chromatographic system comprising:
an analysis flow path connected to at least one liquid sending pump having a liquid sending mode and through which liquid flows that is sent by the liquid sending pump;
a sample injector configured to inject a sample into the analysis flow path;
a separation column configured to separate the injected sample into components;
a detector configured to detect the separated components;
a computer circuit, executing a program, configured to:
specify as a system configuration a count and a connection structure of the liquid sending pumps connected to the analysis flow path;
store, for each of a plurality of different types of system configurations, a preset condition for detecting a liquid sending failure of the liquid sending pump based on the liquid sending mode of the at least one liquid sending pump;
determine the stored preset condition for the specified system configuration and the liquid sending mode of the at least one liquid sending pump; and
detect a liquid sending failure of the liquid sending pump using the determined preset condition.

2. The liquid chromatographic system according to claim 1, comprising a pressure sensor for detecting a liquid sending pressure in the analysis flow path, wherein
the preset condition includes an algorithm of detection of a liquid sending failure of the liquid sending pump with use of a liquid sending pressure detected by the pressure sensor,
the computer circuit is further configured to periodically acquire a liquid sending pressure detected by the pressure sensor and detect a liquid sending failure of the liquid sending pump by using an acquired liquid sending pressure and the algorithm.

3. The liquid chromatographic system according to claim 2, wherein
the algorithm is configured to execute,
a pulsation detection step of obtaining a fluctuation range of a liquid sending pressure in a certain driving period of the liquid sending pump and detecting pulsation on a condition that an obtained fluctuation range exceeds a predetermined reference value, and
a liquid sending failure detection step of detecting a liquid sending failure of the liquid sending pump when the pulsation is detected,
in this order.

4. The liquid chromatographic system according to claim 3, wherein
the algorithm, before the pulsation detection step, is configured to execute:
a pressure decrease calculation step of calculating a decrease range of a liquid sending pressure per period of time that is set based on the driving period of the liquid sending pump;
a trigger detection step of detecting a trigger for an occurrence of pulsation when a decrease range calculated in the pressure decrease calculation step exceeds the reference value; and
execute the pulsation detection step after the trigger is detected in the trigger detection step.

5. The liquid chromatographic system according to claim 3, wherein
the algorithm, before the pulsation detection step, is configured to execute a reference value determination step of determining the reference value to be compared with the fluctuation range.

6. The liquid chromatographic system according to claim 5, wherein
the algorithm of the condition corresponding to a system configuration in which a plurality of liquid sending pumps are connected to the analysis flow path, in the reference value determination step, is configured to determine the reference value in consideration of a contribution ratio of each of the plurality of liquid sending pumps with respect to a liquid sending flow rate in the analysis flow path.

7. The liquid chromatographic system according to claim 3, wherein
the liquid sending pump is a double plunger pump including two plunger pumps that are driven complimentarily with each other, and
the algorithm, in the pulsation detection step, is configured to obtain a difference between the liquid sending pressures at a start point and an end point of a discharging operation of one of the two plunger pumps as a first fluctuation range, obtain a difference between the liquid sending pressures at a start point and an end point of a discharging operation of another one of the two plunger pumps as a second fluctuation value and obtain the fluctuation range with use of the first fluctuation value and the second fluctuation value.

8. The liquid chromatographic system according to claim 7, wherein
the algorithm, in the pulsation detection step, is configured to count only a period in which only one of the first fluctuation value and the second fluctuation value is a positive value as a period in which the fluctuation range exceeds the reference value.

* * * * *